United States Patent
Nomoto (10) Patent No.: US 11,074,712 B2
(45) Date of Patent: Jul. 27, 2021

(54) GRADIENT DIRECTION CALCULATION DEVICE

(71) Applicant: DENSO CORPORATION, Kariya (JP)

(72) Inventor: Shohei Nomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 16/456,276

(22) Filed: Jun. 28, 2019

(65) Prior Publication Data

US 2020/0005484 A1 Jan. 2, 2020

(30) Foreign Application Priority Data

Jun. 29, 2018 (JP) .............................. JP2018-123786

(51) Int. Cl.
*G06T 7/73* (2017.01)
*G06K 9/46* (2006.01)

(52) U.S. Cl.
CPC ................. *G06T 7/73* (2017.01); *G06K 9/46* (2013.01); *G06K 9/4642* (2013.01); *G06T 2207/20072* (2013.01)

(58) Field of Classification Search
CPC ............. G06T 7/73; G06T 2207/20072; G06T 2207/30196; G06T 7/13; G06K 9/6212; G06K 9/6285; G06K 9/4642; G06K 9/4652
See application file for complete search history.

(56) References Cited

U.S. PATENT DOCUMENTS

| 2011/0158538 A1* | 6/2011 | Iwamoto | G06F 16/5838 382/192 |
| 2011/0311133 A1* | 12/2011 | Hirota | G06T 7/0012 382/164 |
| 2012/0177266 A1 | 7/2012 | Tsukizawa et al. | |

(Continued)

FOREIGN PATENT DOCUMENTS

| JP | 2004-007707 A | 1/2004 |
| JP | 2007-288460 A | 11/2007 |
| JP | 2009-301104 A | 12/2009 |

OTHER PUBLICATIONS

Gonzalez et al. "Digital Image Processing."Addison-Wesley Publishing Company, 1992, pp. 418-421 (Year: 1992).*

(Continued)

*Primary Examiner* — Jon Chang
(74) *Attorney, Agent, or Firm* — Maschoff Brennan (57) ABSTRACT

In a gradient direction calculation device, an element gradient vector calculation unit calculates two mutually perpendicular element gradient vectors with respect to a pixel of interest by using a difference in pixel values in the vicinity of the pixel of interest. A quadrant determination unit determines, based on a combination of positive/negative signs of each of the two element gradient vectors, a quadrant among the four quadrants defined by the two element gradient vectors that contains a gradient direction of the pixel of interest. A ratio comparison unit determines comparison results by comparing each of the ratios of magnitudes of the two element gradient vectors with a predetermined threshold. A gradient direction determination unit determines a gradient direction corresponding to a combination of the positive/negative signs and the comparison results.

20 Claims, 10 Drawing Sheets

(56) References Cited

U.S. PATENT DOCUMENTS

2013/0182896 A1 7/2013 Azuma
2017/0293818 A1* 10/2017 Zagaynov ................. G06T 7/13

OTHER PUBLICATIONS

Schowengerdt et al. "Techniques for Image Processing and Classification in Remote Sensing." Academic Press, Inc., 1983, pp. 82-86 (Year: 1983).*
Minkyu Cheon et al., Rotation Invariant Histogram of Oriented Gradients, International Journal of Fuzzy Logic and Intelligent Systems, Dec. 4, 2011, pp. 293-298, vol. 11, No. 4.

* cited by examiner

| $s_1$ | $s_2$ | $c_1$ | $c_2$ | GRADIENT DIRECTION |
|---|---|---|---|---|
| 0 | 0 | 0 | 0 | 0 |
| 0 | 0 | 0 | 1 | 7 |
| 0 | 0 | 1 | 0 | 1 |
| 0 | 0 | 1 | 1 | X |
| 0 | 1 | 0 | 0 | 2 |
| 0 | 1 | 0 | 1 | 3 |
| 0 | 1 | 1 | 0 | 1 |
| 0 | 1 | 1 | 1 | X |
| 1 | 0 | 0 | 0 | 6 |
| 1 | 0 | 0 | 1 | 7 |
| 1 | 0 | 1 | 0 | 5 |
| 1 | 0 | 1 | 1 | X |
| 1 | 1 | 0 | 0 | 4 |
| 1 | 1 | 0 | 1 | 3 |
| 1 | 1 | 1 | 0 | 5 |
| 1 | 1 | 1 | 1 | X |

FIG.13

| SUMMING RESULT | GRADIENT DIRECTION |
|---|---|
| 0 | 0 |
| 1 | 7 |
| 2 | 1 |
| 3 | X |
| 4 | 2 |
| 5 | 3 |
| 6 | 1 |
| 7 | X |
| 8 | 6 |
| 9 | 7 |
| 10 | 5 |
| 11 | X |
| 12 | 4 |
| 13 | 3 |
| 14 | 5 |

GRADIENT DIRECTION CALCULATION DEVICE

CROSS-REFERENCE TO RELATED APPLICATION

This application is based on and claims the benefit of priority from earlier Japanese Patent Application No. 2018-123786 filed Jun. 29, 2018, the description of which is incorporated herein by reference.

BACKGROUND

Technical Field

The present disclosure relates to calculating a gradient direction of a pixel.

Related Art

An object detection device is known which uses a feature amount based on a brightness gradient to detect a target object from an image. For example, as a device that detects a human region from an image, there is known a device that detects a human region by performing an SVM (Support Vector Machine) operation using a distribution histogram of the edge direction (or "brightness gradient", or simply "gradient") of each small region (or "cell") in a detection target region (or "ROI": Region of Interest) as a feature amount.

DESCRIPTION OF SPECIFIC EMBODIMENTS

Figure 1:
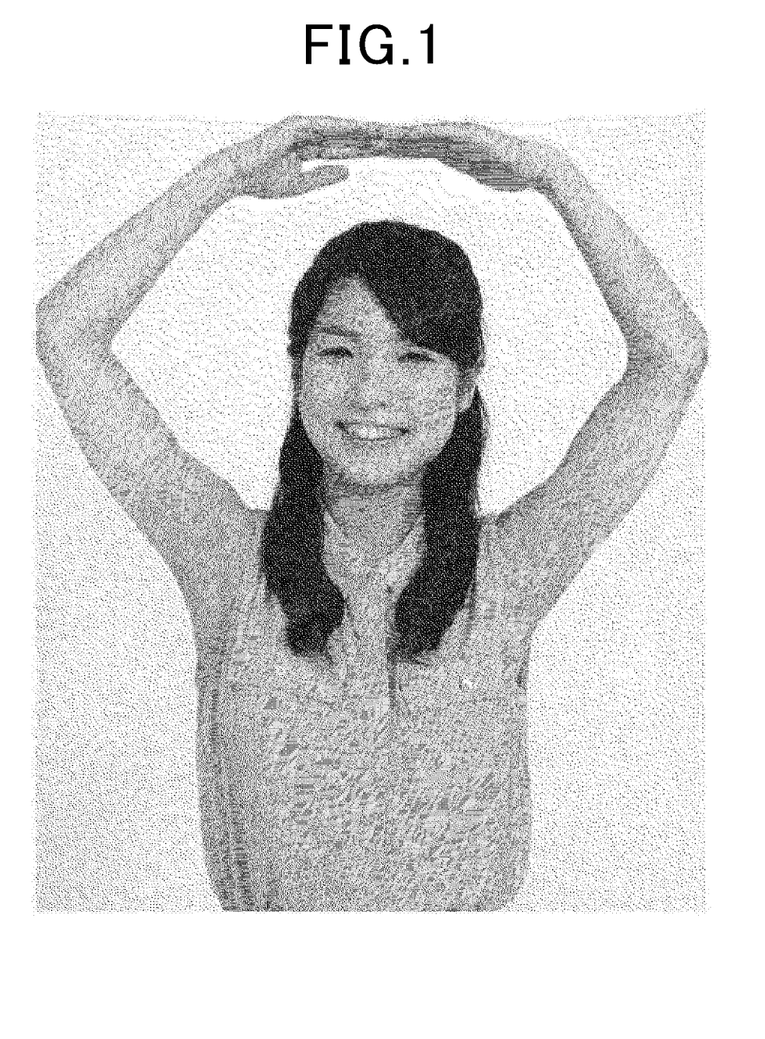
FIG. 1 is a diagram showing an example of an ROI.
Figure 2:
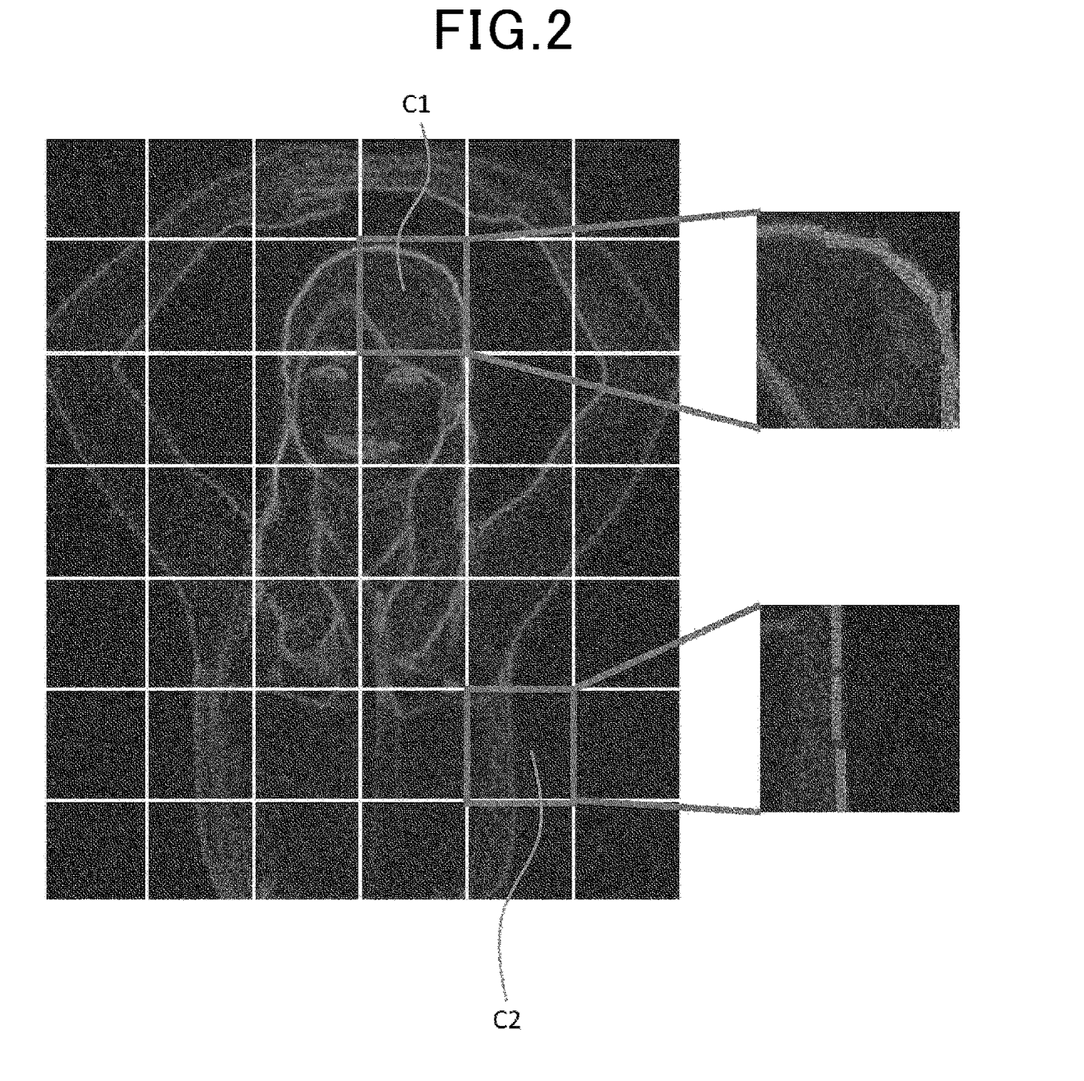
FIG. 2 is a diagram showing an edge image of the ROI in FIG. 1.

The above known object detection device is disclosed in, for example, JP-A-2009-301104. FIG. 1 is a diagram showing an example of an ROI. FIG. 2 is a diagram showing an edge image of the ROI in FIG. 1. An ROI is divided into a plurality of cells. In FIG. 2, cell C1 and cell C2 are representatively shown. A cell consists of 5×5 pixels. An object detection device calculates a gradient direction for each pixel. In FIG. 2, the gradient direction of each pixel is shown for cell C1 and cell C2. The gradient direction of each pixel is classified into one of eight directions.

Figure 3A:
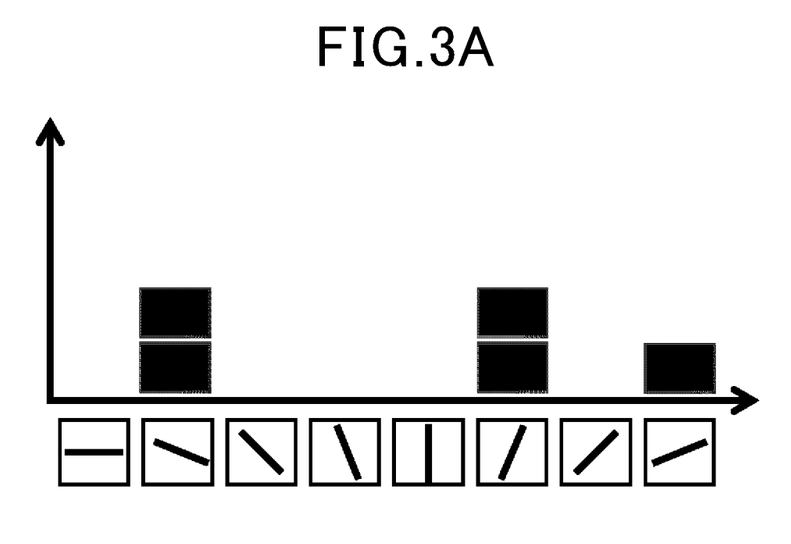
FIGS. 3A and 3B are gradient direction histograms of cell C1 and cell C2.
Figure 3B:
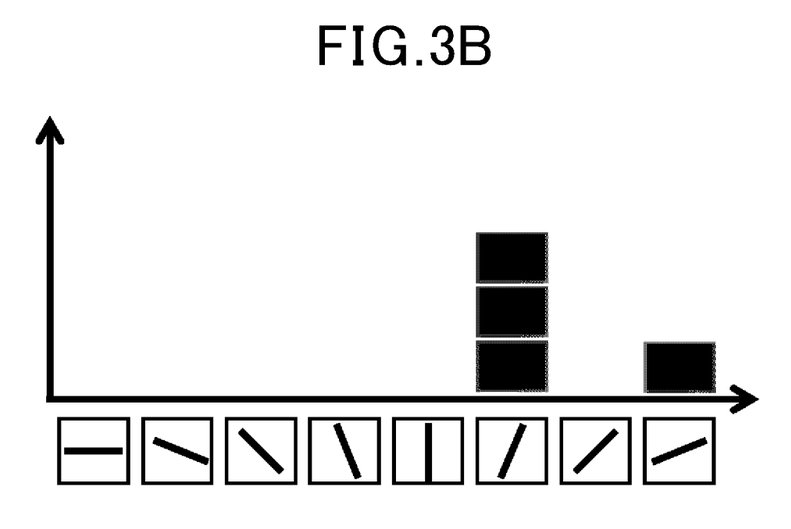

FIG. 3A is a gradient direction histogram of cell C1, and FIG. 3B is a gradient direction histogram of cell C2. The SVM performs an operation on the ROI using these gradient direction histograms as a feature amount to determine whether or not the ROI is a human region.

Figure 4:
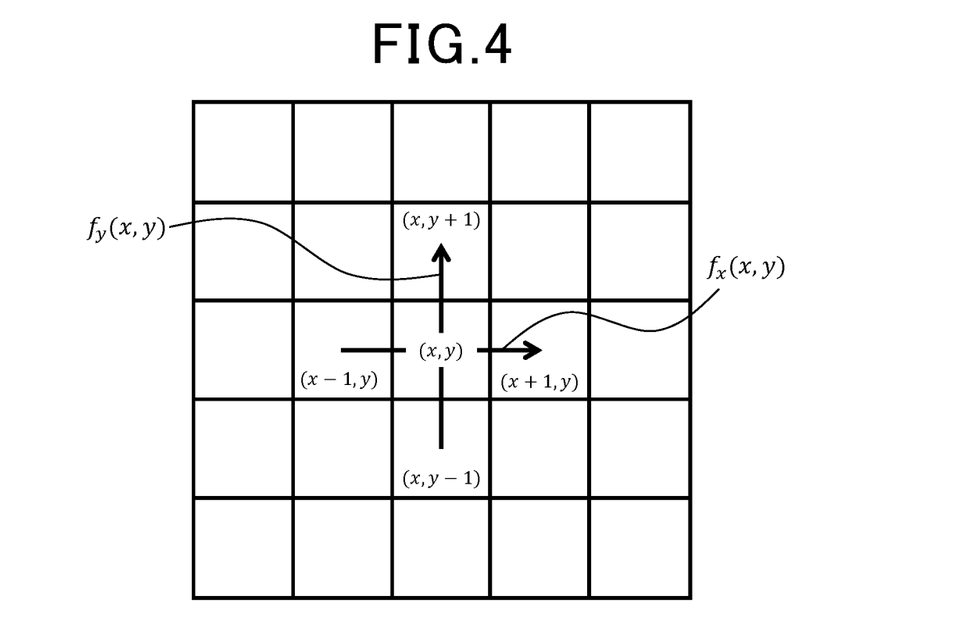
FIG. 4 is a diagram for explaining an example of a calculation method of a pixel gradient direction.

FIG. 4 is a diagram for explaining an example of a calculation method of a pixel gradient direction. The gradient direction of each pixel is calculated according to the following equation (1).

$$\theta(x, y) = \tan^{-1} \frac{f_x(x, y)}{f_y(x, y)} \quad (1)$$

Here, as shown in FIG. 4 and in equation (2), $f_x(x, y)$ and $f_y(x, y)$ are calculated using brightness values in the vicinity of the target pixel.

$$f_x(x, y) = L(x+1, y) - L(x-1, y) \quad (2)$$
$$f_y(x, y) = L(x, y+1) - L(x, y-1)$$

Figure 5:
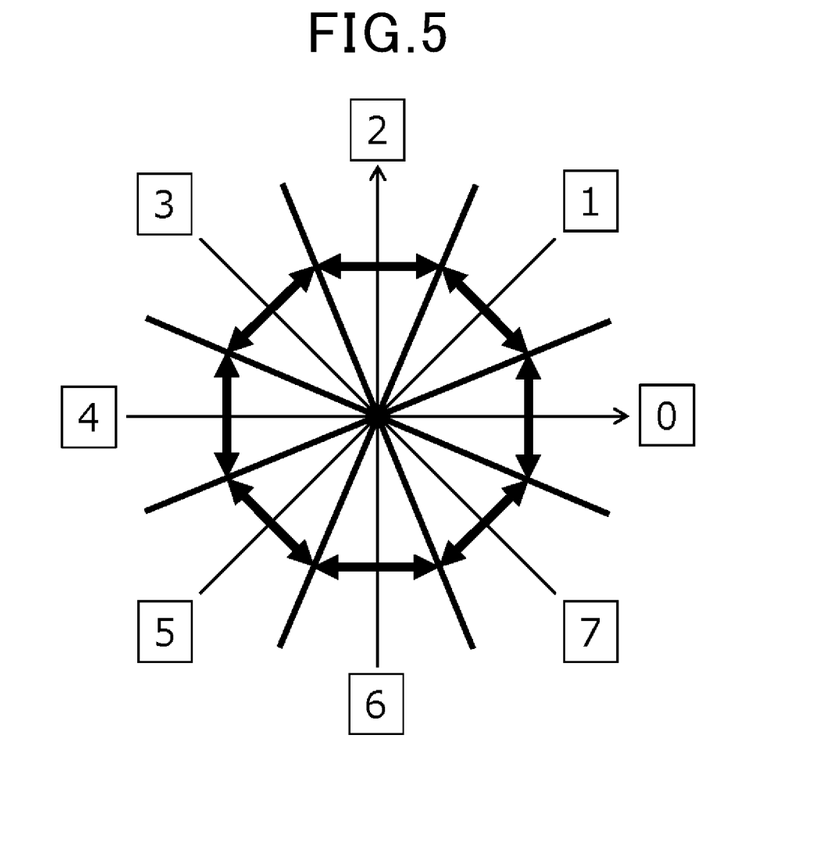
FIG. 5 is a diagram showing the eight directions defined as gradient directions.

FIG. 5 is a diagram showing the eight directions defined as gradient directions. Each of the directions is assigned a number from 0 to 7. The gradient direction of each pixel is classified into one of the eight directions by processing the result from equation (1) according to the following equation (3).

$$\begin{aligned}&\text{if } (-25.5 < \phi(x, y) \leq 22.5) \text{ Zeroth direction} \\ &\text{else if } (22.5 < \phi(x, y) \leq 67.5) \text{ First direction} \\ &\text{else if } (67.5 < \phi(x, y) \leq 111.5) \text{ Second direction}\end{aligned} \quad (3)$$

As described above, the gradient direction of each pixel can be calculated by the operations according to equation (1)

and equation (3). However, equation (1) requires a calculation using a floating-point transcendental function, and equation (3) requires successive magnitude comparisons. Therefore, in conventional gradient direction calculation devices, increases in the circuit scale and the operation cycle are a problem.

In view of the foregoing, it is desired to have an object of providing a gradient direction calculation device capable of calculating the gradient direction of each pixel while inhibiting increases in the circuit scale and the operation cycle.

Hereinafter, an embodiment of the present disclosure is described with reference to the drawings. The embodiment described below presents an example of implementing the present disclosure, and the present disclosure is in no way limited to the specific configuration described below. When implementing the present disclosure, a specific configuration according to the embodiment may be employed as appropriate.

Figure 6:
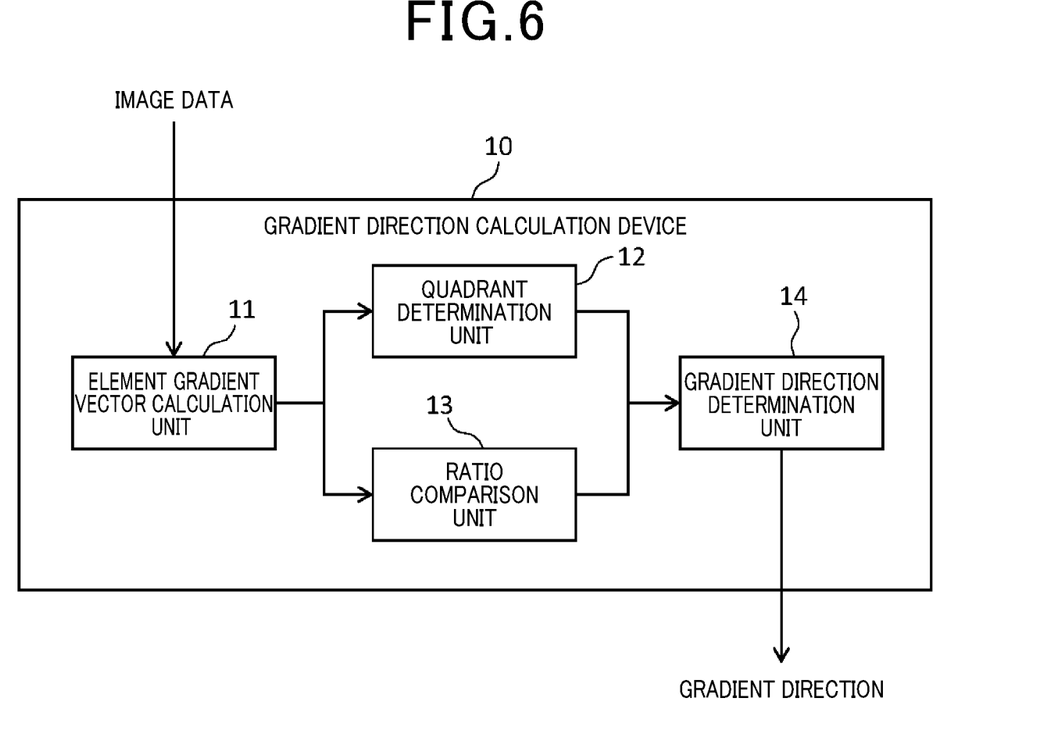
FIG. 6 is a block diagram showing a configuration of a gradient direction calculation device according to one embodiment of the present disclosure.

FIG. 6 is a block diagram showing a configuration of a gradient direction calculation device according to an embodiment of the present disclosure. As shown in FIG. 6, the gradient direction calculation device 10 includes an element gradient vector calculation unit 11, a quadrant determination unit 12, a ratio comparison unit 13, and a gradient direction determination unit 14. The gradient direction calculation device 10 inputs image data, and outputs a gradient direction for each pixel of the image data.

The gradient direction calculation device 10 of the present embodiment shown in FIG. 6 may have some or all of the elements realized by software. In this case, the gradient direction calculation device 10 has a hardware configuration that includes an arithmetic processing unit, a memory, an auxiliary storage device that stores programs and data (such as an SSD or an HDD), and the like. The configuration in FIG. 6 may be realized by executing as software a gradient direction calculation program of the present embodiment.

Figure 7:
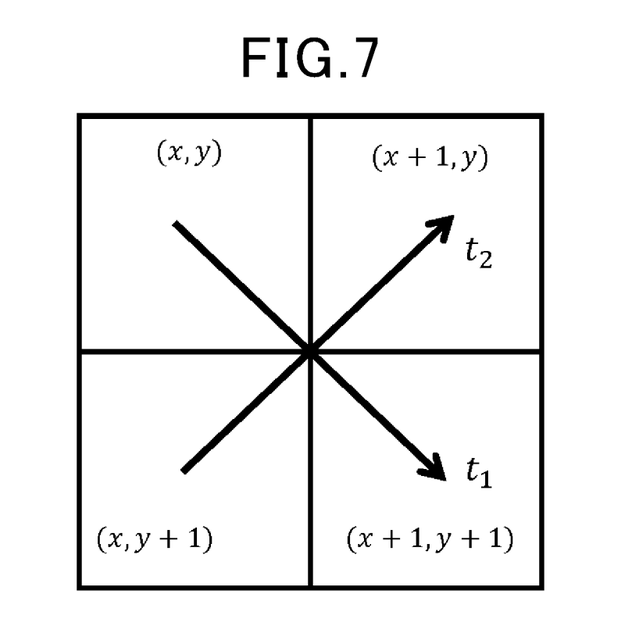
FIG. 7 is a diagram for explaining processing that calculates, with respect to a pixel of interest, a magnitude relationship between element brightness gradient vectors according to the embodiment of the present disclosure.

FIG. 7 is a diagram for explaining processing that calculates, with respect to a pixel of interest (x, y), a magnitude relationship between element brightness gradient vectors. In this example, a brightness gradient vector $g(x,y)$ of the pixel of interest (x, y) is defined as shown in equation (4) below.

$$\vec{g}(x,y) = t_1(x,y) \cdot \vec{t_1} + t_2(x,y) \cdot \vec{t_2}. \tag{4}$$

Here, $t_1$ and $t_2$ are respectively a unit vector from pixel (x, y) toward pixel (x+1, y+1) and a unit vector from pixel (x, y+1) toward pixel (x+1, y). The coefficients $t_1(x, y)$ and $t_2(x, y)$ are assigned according to a difference in the brightness L of pixels that intersect each other in a diagonal direction as shown in equation (5) below. In equation (4), $t_1(x, y)$ and $t_2(x, y)$ on the right hand side are each referred to as element brightness gradient vectors, and the unit vectors $t_1$ and $t_2$ are each referred to as unit element gradient vectors.

$$t_1(x, y) = L(x+1, y+1) - L(x, y) \tag{5}$$
$$t_2(x, y) = L(x+1, y) - L(x, y+1)$$

Image data is input to the element gradient vector calculation unit 11. The element gradient vector calculation unit 11 calculates the directions of two mutually perpendicular element brightness gradient vectors. Specifically, the element gradient vector calculation unit 11 calculates the directions of the element brightness gradient vectors according to equation (6) below.

$$s_1 = \text{if}(L(x+1, y+1) > L(x, y)) \text{ then } 0 \text{ else } 1 \tag{6}$$
$$s_2 = \text{if}(L(x+1, y) > L(x, y+1)) \text{ then } 0 \text{ else } 1$$

Here, $s_1$ is a parameter that expresses the sign (that is to say, the positive/negative sign) of the coefficient $t_1(x,y)$ of the unit element brightness gradient vector $t_1$ from the pixel (x, y) toward the lower right pixel (x+1, y+1) as a 1 or 0. Further, $s_2$ is a parameter that expresses the sign (that is to say, the positive/negative sign) of the coefficient $t_2(x, y)$ of the unit element brightness gradient vector $t_2$ from the pixel (x, y+1) toward the upper right pixel (x+1, y) as a 1 or 0.

Figure 8:
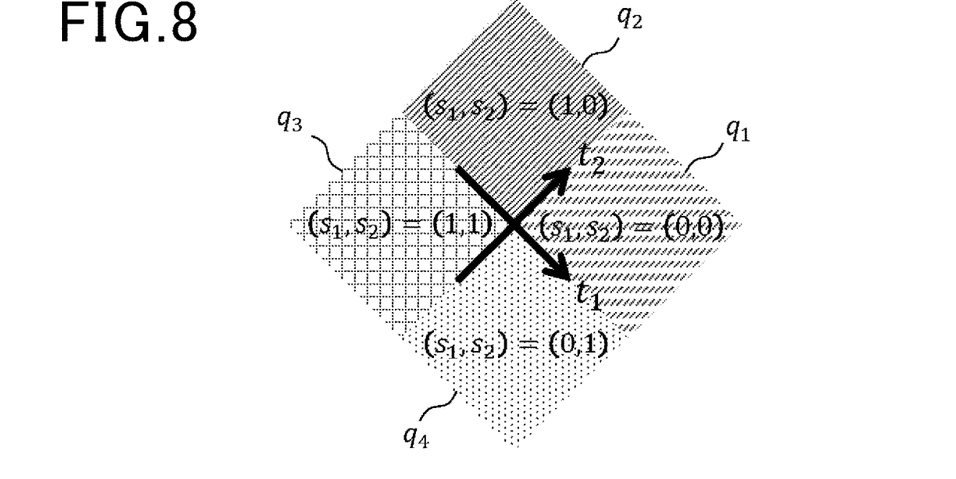
FIG. 8 is a diagram for explaining processing that selects one of four quadrants from a combination of signs of two element brightness gradient vectors according to the embodiment of the present disclosure.

FIG. 8 is a diagram for explaining processing that selects one of four quadrants from the values of $s_1$ and $s_2$. The quadrant determination unit 12 determines to which of four quadrants $q_1$, $q_2$, $q_3$, and $q_4$, which are defined by the two unit element brightness gradient vectors $t_1$ and $t_2$, the direction of the gradient direction vector g of the pixel of interest belongs. The quadrant determination unit 12 determines, according to FIG. 8, to which quadrant the direction of the brightness gradient vector g belongs from $(s_1, s_2)$, which is the pair of directions of the two mutually perpendicular element brightness gradient vectors. Specifically, the quadrant determination unit 12 selects the right quadrant $q_1$ in FIG. 8 when $s_1$ and $s_2$ are both zero, selects the upper quadrant $q_2$ in FIG. 8 when $s_1$ is 1 and $s_2$ is 0, selects the left quadrant $q_3$ in FIG. 8 when $s_1$ and $s_2$ are both 1, and selects the lower quadrant $q_4$ in FIG. 8 when $s_1$ is 0 and $s_2$ is 1.

Figure 9:
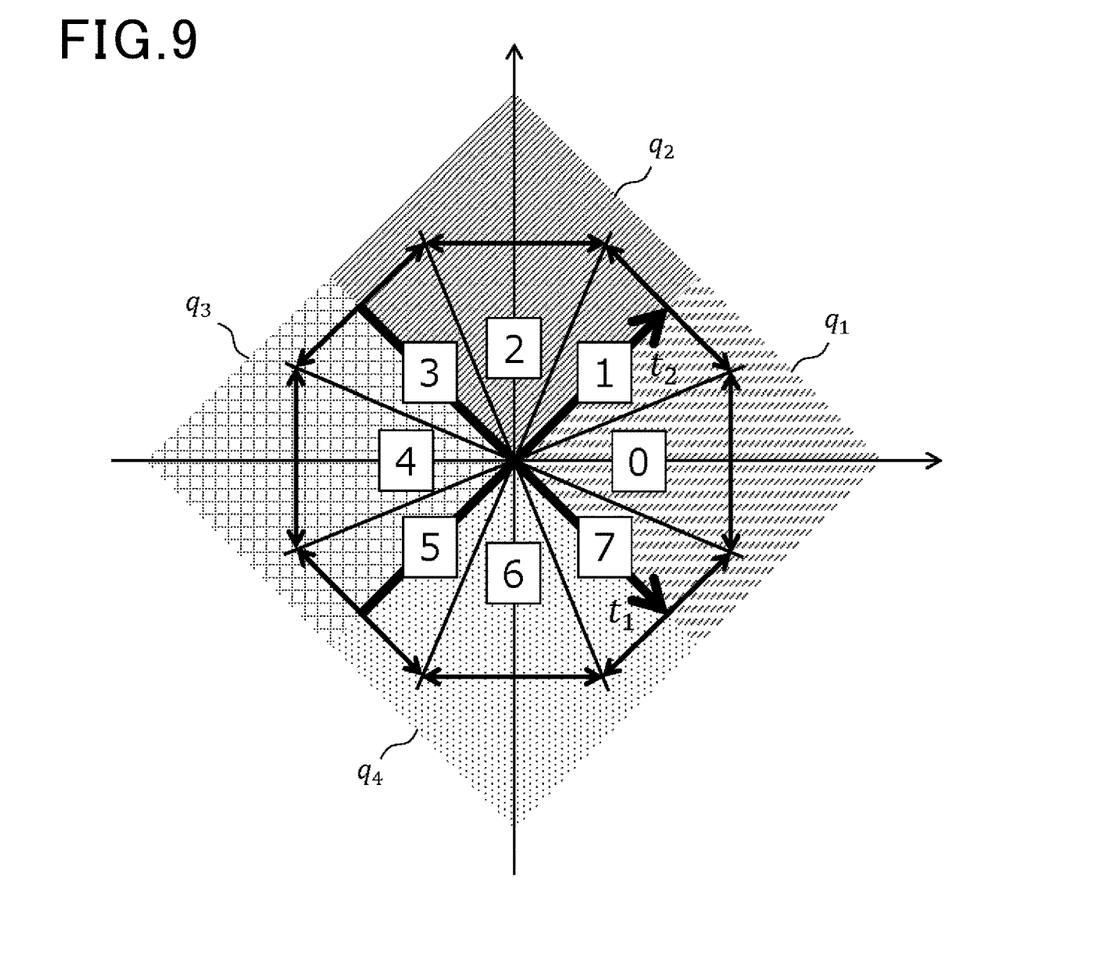
FIG. 9 is a diagram in which the four quadrants in FIG. 8 are overlaid with respect to the eight directions defined in FIG. 5.

FIG. 9 is a diagram in which the four quadrants in FIG. 8 are overlaid with respect to the eight directions defined in FIG. 5. As shown in FIG. 9, it can be understood that the direction of the brightness gradient vector $g(x, y)$ is in the zeroth direction, the seventh direction, or the first direction when the right quadrant $q_1$ is selected by the quadrant determination unit 12, the direction of the brightness gradient vector $g(x, y)$ is in the second direction, the first direction, or the third direction when the upper quadrant $q_2$ is selected, the direction of the brightness gradient vector $g(x, y)$ is in the fourth direction, the third direction, or the fifth direction when the left quadrant $q_3$ is selected, and the direction of the brightness gradient vector $g(x, y)$ is in the sixth direction, the fifth direction, or the seventh direction when the lower quadrant $q_4$ is selected. That is to say, according to the operation by the quadrant determination unit 12, the gradient direction can be determined as being one of the three gradient directions included in the selected quadrant.

The ratio comparison unit 13 calculates the comparison results $c_1$ and $c_2$ by means of equation (7) below in order to determine one of the three gradient directions included in the selected quadrant.

$$c_1 = \text{if}((|t_2(x, y)| \times 169 - |t_1(x, y)| \times 70 > 0) \text{ then } 0 \text{ else } 1 \tag{7}$$
$$c_2 = \text{if}((|t_1(x, y)| \times 169 - |t_2(x, y)| \times 70 > 0) \text{ then } 0 \text{ else } 1$$

Figure 10A:
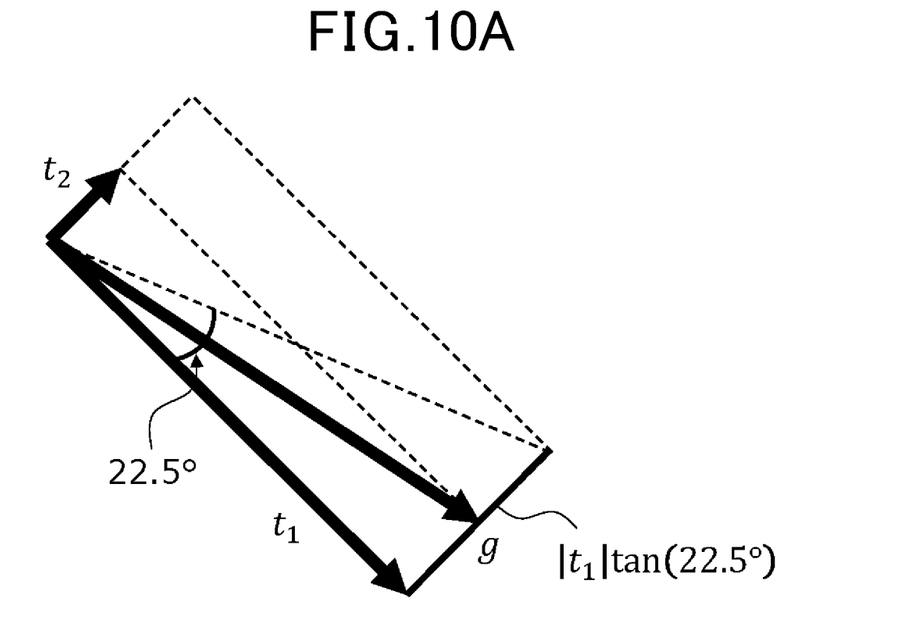
FIG. 10A is a diagram showing the relationship between a ratio of magnitudes of two element brightness gradient vectors and the direction of a brightness gradient vector (when one of the element brightness gradient vectors is small) according to the embodiment of the present disclosure.
Figure 10B:
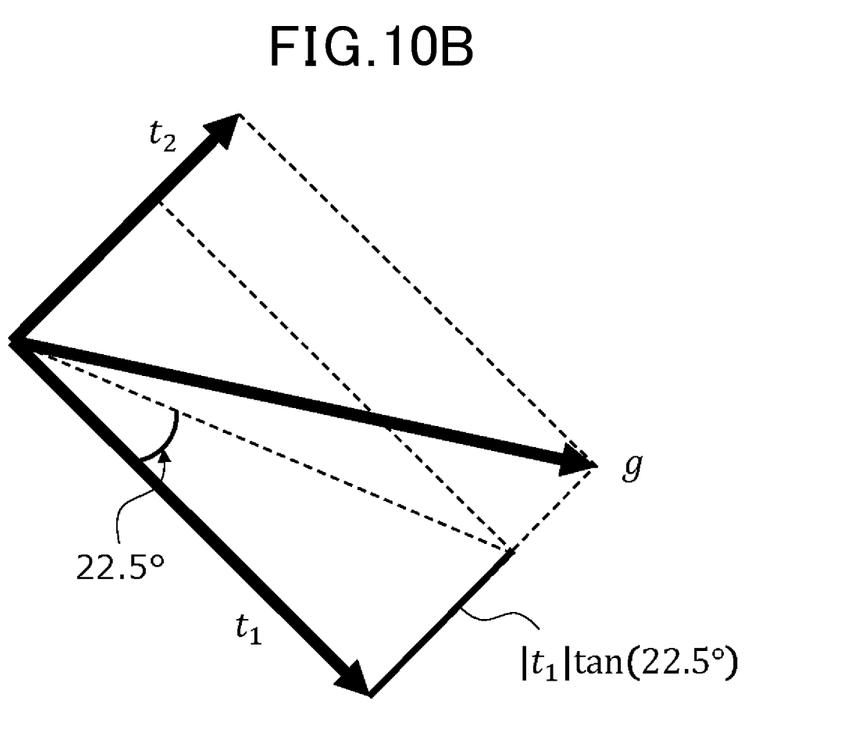
FIG. 10B is a diagram showing the relationship between a ratio of magnitudes of two element brightness gradient vectors and the direction of a brightness gradient vector (when one of the element brightness gradient vectors is large) according to the embodiment of the present disclosure.

The derivation of equation (7) is described. FIGS. 10A and 10B are diagrams showing the relationship between a ratio of magnitudes of the coefficient $t_1(x, y)$ and the coefficient $t_2(x, y)$ and the direction of the brightness gradient vector g. FIGS. 10A and 10B show a case where the right quadrant $q_1$ has been selected by the quadrant determination unit 12. As shown in FIG. 10A, when $|t_2(x, y)|$ is smaller than the magnitude of $|t_1(x, y)|\tan(22.5°)$, the brightness gradient vector g is in the seventh direction. On the other hand, although not illustrated, when $|t_1(x, y)|$ is smaller than the magnitude of $t_2(x, y) \tan(22.5°)$, the brightness gradient vector g is in the first direction. Furthermore, as shown in FIG. 10B, when $|t_2(x, y)|$ is larger than the magnitude of $|t_1(x, y)|\tan(22.5°)$, and $|t_1(x, y)|$ is larger than the magnitude of $t_2(x, y) \tan(22.5°)$, the brightness gradient vector g is in the zeroth direction.

That is to say, by performing the magnitude comparisons according to equation (8) below, that is to say, magnitude comparisons of the ratios of the element brightness gradient vectors $t_1$ and $t_2$ with a predetermined threshold, one of the three gradient directions included in the relevant quadrant can be determined.

$$|t_2(x, y)| < |t_1(x, y)| \tan(22.5°) \quad (8)$$
$$|t_1(x, y)| < |t_2(x, y)| \tan(22.5°)$$

Here, $\tan(22.5°)$ is written:

$$\tan(22.5°) = 0.41421 \ldots \approx 70/169 (= 0.41420 \ldots) \quad (9)$$

and can be approximated by a fraction in which both the denominator and the numerator are integers.

As a result, the magnitude comparisons between ratios of $|t_1(x, y)|$ and $|t_2(x, y)|$ with the predetermined threshold $(\tan(22.5°))$ according to equation (8) can be rewritten into equations such as those in equation (10) below, where multiplication and summation are performed by summing values obtained by multiplication of one of the values by the denominator "169" and multiplication of the other value by the numerator "−70", and determining the positive/negative with respect to the resulting value.

$$|t_2(x, y)| \times 169 - |t_1(x, y)| \times 70 < 0 \quad (10)$$
$$|t_1(x, y)| \times 169 - |t_2(x, y)| \times 70 < 0$$

Therefore, the ratio comparison unit 13 performs magnitude comparisons according to equation (10), which are calculations that compare each of the ratios of magnitudes of the two coefficients ($|t_2(x, y)|/|t_1(x, y)|$ and $|t_1(x, y)|/|t_2(x, y)|$) with a predetermined threshold ($70/169$), and then outputs the comparison results $c_1$ and $c_2$ according to equation (7).

In contrast to the coefficient "169" constituting the threshold, which is expressed by eight bits, the coefficient "70" constituting the threshold is smaller than the coefficient "169" and can be expressed by seven bits. As a result, in equation (10), the smaller coefficient "70" having fewer bits is assigned a negative sign "−" and is made a negative number. The signed coefficient "−70" can be expressed by eight bits. Therefore, the calculations on the left hand side of both the first and second lines can be achieved by multiplication of eight-bit coefficients.

Figure 11:
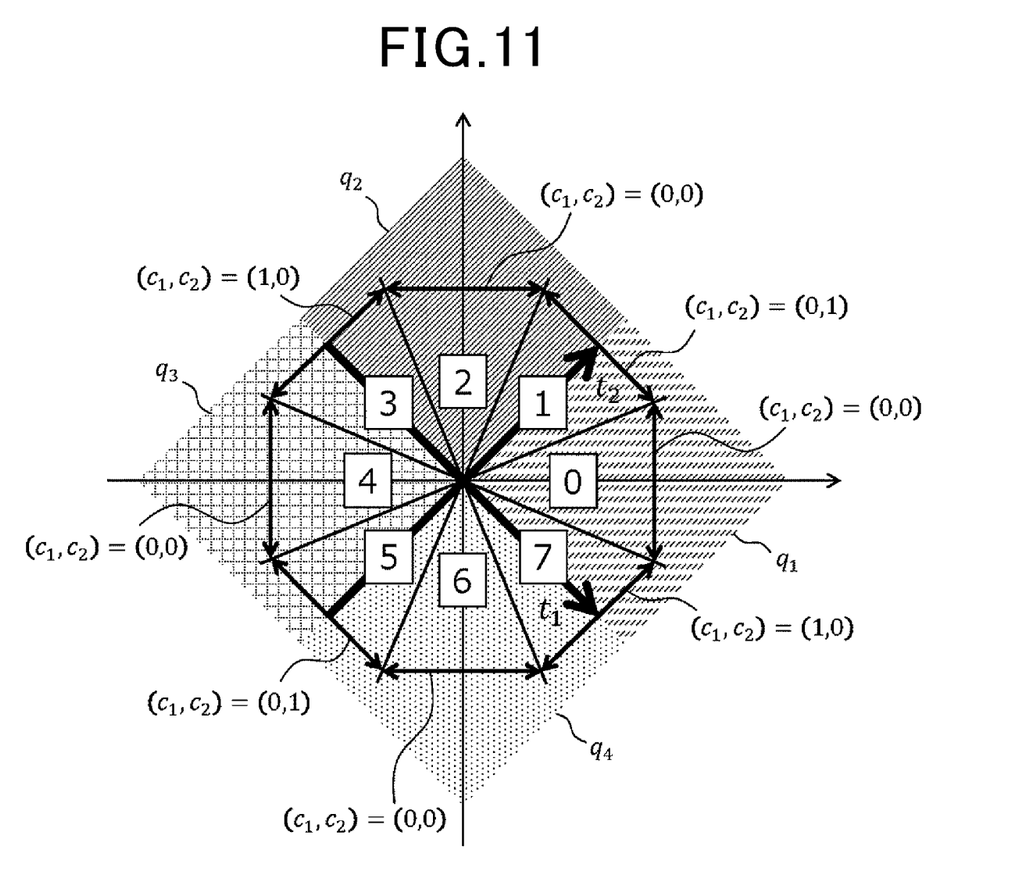
FIG. 11 is a diagram showing the relationship between comparison results and a gradient direction (zeroth direction to seventh direction) of a brightness gradient vector according to the embodiment of the present disclosure.

FIG. 11 is a diagram showing the relationship between the comparison results $c_1$ and $c_2$ and the gradient direction (zeroth direction to seventh direction) of the brightness gradient vector g. As shown in FIG. 11, the gradient direction of the brightness gradient vector g is in the third direction or the seventh direction when $(c_1, c_2) = (1, 0)$. The gradient direction of the brightness gradient vector g is in the first direction or the fifth direction when $(c_1, c_2) = (0, 1)$. The gradient direction of the brightness gradient vector g is in the zeroth direction, the second direction, the fourth direction, or the sixth direction when $(c_1, c_2) = (0, 0)$. Note that $(c_1, c_2) = (1, 1)$ does not occur.

The quadrant determination unit 12 outputs the result specifying a quadrant $(s_1, s_2)$ to the gradient direction determination unit 14. The ratio comparison unit 13 outputs the result narrowing down the direction $(c_1, c_2)$ to the gradient direction determination unit 14. The gradient direction determination unit 14 uses the $s_1$, $s_2$, $c_1$, and $c_2$ inputs to refer to a lookup table to determine which of the eight directions contains the gradient direction of the brightness gradient vector g. The gradient direction determination unit 14 stores the lookup table for this purpose.

Figure 12:
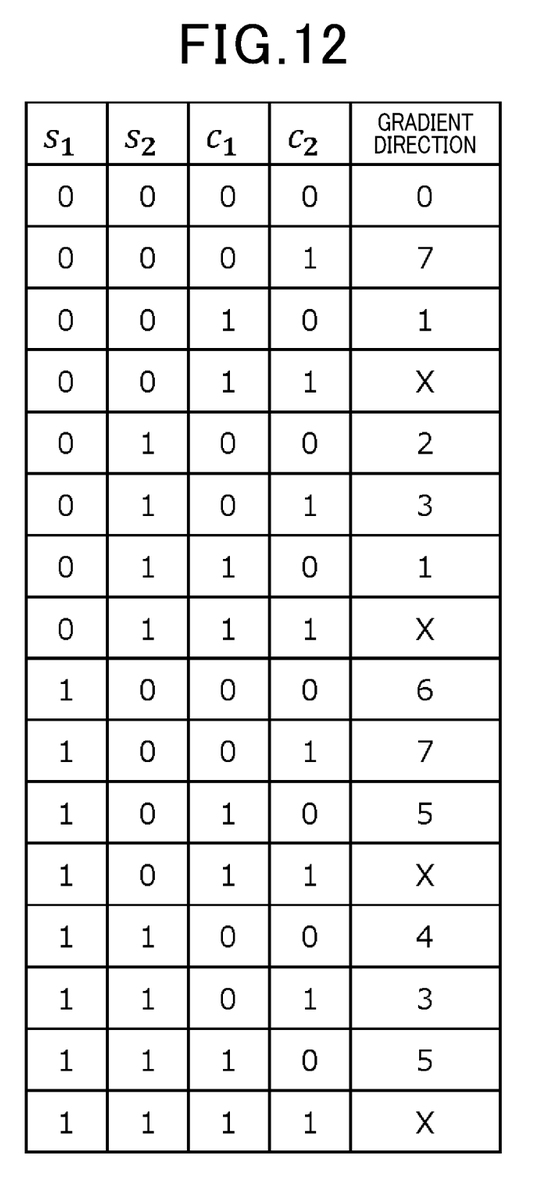
FIG. 12 is a diagram showing a lookup table that defines the relationships between gradient directions and combinations of a result specifying a quadrant and a result narrowing down the direction according to the embodiment of the present disclosure.

FIG. 12 is a diagram showing a lookup table that defines the relationships between gradient directions and combinations of a result specifying a quadrant $(s_1, s_2)$ and a result narrowing down the direction $(c_1, c_2)$. The gradient direction determination unit 14 refers to the lookup table and determines the gradient direction based on the $s_1$, $s_2$, $c_1$, and $c_2$ inputs. The gradient direction determination unit 14 outputs the determined gradient direction for each pixel.

The parameters $s_1$, $s_2$, $c_1$ and $c_2$ are each one-bit data that take values of 0 or 1, and represent four bits of data in total. The gradient direction determination unit 14 refers to the lookup table using the four bits of data to acquire a gradient direction of 0 to 7, which is represented by three bits.

As described above, in the gradient direction calculation device 10 of the present embodiment, the element gradient vector calculation unit 11 calculates two mutually perpendicular element brightness gradient vectors with respect to a pixel of interest from the brightness difference of pixels in the vicinity of the pixel of interest, the quadrant determination unit 12 determines, based on a combination of the signs (that is to say, the positive/negative signs) $s_1$ and $s_2$ of the coefficients $t_1(x, y)$ and $t_2(x, y)$ of the two element brightness gradient vectors, which of the quadrants among the four quadrants $q_1$, $q_2$, $q_3$ and $q_4$ defined by the two element brightness gradient vectors contains the gradient direction of the pixel of interest, the ratio comparison unit 13 determines the comparison results $c_1$ and $c_2$ by comparing each of the ratios of magnitudes (that is to say, the absolute values) of the coefficients $t_1(x, y)$ and $t_2(x, y)$ of the two element brightness gradient vectors with a predetermined threshold, and the gradient direction determination unit 14 determines the gradient direction (zeroth direction to seventh direction) corresponding to the combination of $s_1$, $s_2$, $c_1$ and $c_2$ by referring to the lookup table.

Therefore, according to the gradient direction calculation device 10 of the present embodiment, a calculation using a floating-point transcendental function is not required to determine the gradient direction of the brightness gradient vector g of each pixel, and an operation that performs successive magnitude comparisons is also unnecessary. Therefore, increases in the circuit scale and operation cycle can be inhibited.

MODIFICATIONS

First Modification

In the embodiment described above, a brightness image is used to determine the gradient. However, the gradient direction calculation device 10 may determine the gradient of a pixel using data other than a brightness image.

Second Modification

In the embodiment described above, brightness values of pixels to the right, below, and to the lower right of the pixel of interest are used for the two element brightness gradient vectors $t_1$ and $t_2$, but it is not limited to this. For example, brightness values of pixels to the left, above, and to the upper left of the pixel of interest may be used to calculate the two mutually perpendicular element brightness gradient vectors $t_1$ and $t_2$. Further, as described using FIG. 4, the brightness difference of pixels above and below the pixel of interest and the brightness difference of pixels to the left and right of the pixel of interest may be used to define the two mutually perpendicular element brightness gradient vectors $t_1$ and $t_2$.

Third Modification

In the embodiment described above, the element gradient vector calculation unit 11 may calculate the signs (that is to say, the positive/negative signs) of the coefficients $t_1(x, y)$ and $t_2(x, y)$ using a sgn function (that is to say, a sign function) according equation (11) below instead of equation (6).

$$s_1 = \text{sgn}(L(x+1, y+1) - L(x, y))$$
$$s_2 = \text{sgn}(L(x+1, y) - L(x, y+1))$$
(11)

Here, the sgn function is a function that becomes 0 when a variable has a positive value, and becomes 1 when a variable has a negative value. In the case of the present modification, $s_1=0$ when the coefficient $t_1(x, y)$ is positive, and $s_1=1$ when the coefficient $t_1=(x, y)$ is negative. Furthermore, $s_2=0$ when the coefficient $t_2(x, y)$ is positive, and $s_2=1$ when the coefficient $t_2(x, y)$ is negative.

The element gradient vector calculation unit 11 uses the values of $s_1$ and $s_2$ obtained in this manner to determine the quadrant corresponding to $s_1$ and $s_2$ according to FIG. 8.

Fourth Modification

Furthermore, in the embodiment described above, the gradient direction determination unit 14 determines the gradient direction corresponding to the combination of $s_1$, $s_2$, $c_1$ and $c_2$ by referring to a lookup table. However, the gradient direction determination unit 14 may instead perform the calculation according to equation (12) below, and determine the gradient direction that corresponds to the result.

$$\text{Addition result} = s_1 \times 8 + s_2 \times 4 + c_1 \times 2 + c_2$$
(12)

Figure 13:
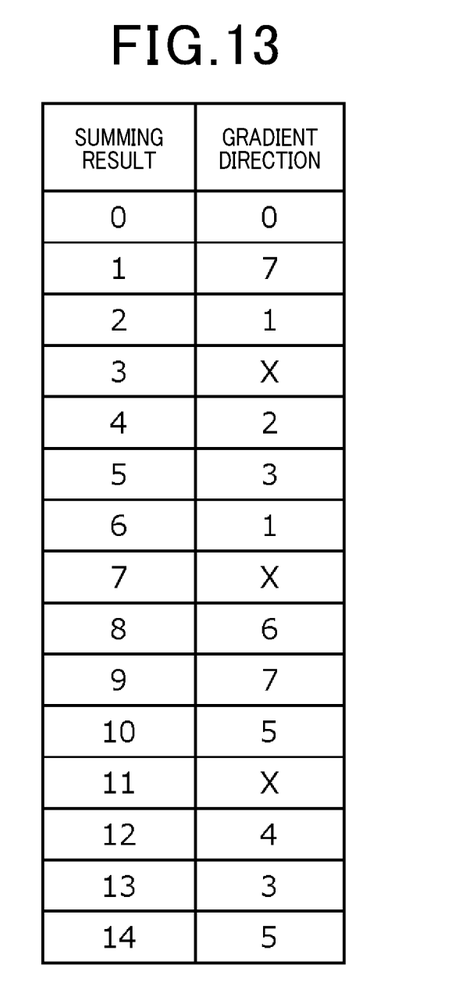
FIG. 13 is a diagram showing a lookup table according to a modification of the embodiment of the present disclosure.

FIG. 13 is a diagram showing a lookup table used in the present modification. The gradient direction determination unit 14 refers to the lookup table in FIG. 13 and determines the gradient direction (zeroth direction to seventh direction) corresponding to the summing result from equation (12). The present modification is particularly advantageous in those cases where the gradient direction determination unit 14 cannot perform bit operations at high speed.

Fifth Modification

In the embodiment described above, $\tan(22.5°)$ (=0.41421 . . . ) is approximated by a fraction ($^{70}/_{169}$=0.41420 . . . ) using an eight-bit number "169" and a seven-bit number "70". However, the approximation accuracy can be reduced, for example, to approximate $\tan(22.5°)$ using a fraction ($^2/_5$=0.4) using a three-bit number "5" and a two-bit number "2". In this case, although the accuracy of the gradient direction of the brightness gradient direction vector is slightly inferior, the subsequent processing such as object detection is not significantly affected. Consequently, it is anticipated that the reduction in object detection accuracy can be kept to within an allowable range, while enabling calculation costs to be significantly reduced.

Sixth Modification

The gradient direction calculation device of the present embodiment is capable of calculating the gradient direction of each pixel with respect to input image data. Therefore, this device can be used to realize an object detection device. An object detection device decomposes a target image or an image derived from a target image (for example, an edge image) into a plurality of cells, and generates a gradient direction histogram for each cell by posting the gradient direction (one of eight directions) of each pixel in each cell.

An object detection device may determine whether or not a detection object is present by joining the gradient direction histograms of a plurality of cells into a feature vector (HoG feature amount), calculating an inner product of the feature vector and a weight coefficient vector learned based on the detection object, and comparing the inner product with a predetermined threshold. That is to say, the gradient direction calculation device of the present embodiment may be used to calculate the HoG feature amount in an object detection device that uses an SVM to detect an object.

In summary, one aspect of the present disclosure provides a gradient direction calculation device that calculates a gradient direction of a pixel. In the gradient direction calculation device, an element gradient vector $(t_1(x, y)t_1, t_2(x, y)t_2)$ calculation unit 11 calculates two mutually perpendicular element gradient vectors with respect to a pixel of interest by using a difference in pixel values in the vicinity of the pixel of interest. A quadrant determination unit 12 determines, based on a combination of positive/negative signs $(s_1, s_2)$ of each of the two element gradient vectors, a quadrant among the four quadrants $(q_1, q_2, q_3, q_4)$ defined by the two element gradient vectors that contains a gradient direction of the pixel of interest. A ratio comparison unit 13 determines comparison results $(c_1, c_2)$ by comparing each of the ratios of magnitudes of the two element gradient vectors with a predetermined threshold. A gradient direction determination unit 14 determines a gradient direction (zeroth direction to seventh direction) corresponding to a combination of the positive/negative signs and the comparison results.

With such a configuration, a calculation using a floating-point transcendental function is not required, and successive magnitude comparisons also become unnecessary. Therefore, increases in the circuit scale and the repetition frequency of the operation cycle can be inhibited.

The quadrant determination unit may determine the direction of an element gradient vector by simply comparing the magnitudes of the pixel values of the two pixels that constitute the element gradient vector rather than using an element gradient vector calculated by the element gradient vector calculation unit. Such a magnitude comparison substantially corresponds to determining the positive/negative sign of an element gradient vector.

Furthermore, the ratio comparison unit may obtain a comparison result by comparing a value obtained by multiplying the magnitude (that is to say, an absolute value, hereinafter the same) of one of the two element gradient vectors by a predetermined coefficient, and the magnitude of the other element gradient vector. The ratio comparison unit may also obtain a comparison result according to the sign (that is to say, the positive/negative sign) of the difference between a value obtained by multiplying the magnitude of one of the two element gradient vectors by a predetermined coefficient, and the magnitude of the other element gradient vector. The ratio comparison unit may also obtain a comparison result according to the sign (that is to say, the positive/negative sign) of a value obtained by multiplying the magnitude of one of the two element gradient vectors with a predetermined coefficient (for example, an integer), multiplying the magnitude of the other element gradient vector with a predetermined coefficient (for example, an integer), and then summing the products. Each of these calculations is equivalent and corresponds to a calculation that "determines comparison results ($c_1$, $c_2$) by comparing each of the ratios of magnitudes of the two element gradient vectors with a predetermined threshold".

Furthermore, in order to "compare each of the ratios of magnitudes of the two element gradient vectors with a predetermined threshold", ratios of magnitudes of the two element gradient vectors (two ratios: $t_2(x, y)/t_1(x, y)$ and $t_1(x, y)/t_2(x, y)$) may be compared with a single threshold (for example, $70/169$). Further, a ratio of magnitudes of the two element gradient vectors (one ratio: $t_2(x, y)/t_1(x, y)$ or $t_1(x, y)/t_2(x, y)$) may also be compared with two thresholds (for example, $70/169$ and $169/70$).

What is claimed is:

1. A gradient direction calculation device that calculates a gradient direction of a pixel, comprising:
   a non-transitory memory storing one or more computer programs; and
   a processor executing the one or more computer programs to:
      calculate two element gradient vectors with respect to a pixel of interest by using a difference in pixel values a vicinity of the pixel of interest, the two element gradient vectors being mutually perpendicular;
      determine, based on a combination of signs of the two element gradient vectors, which one of four quadrants defined by the two element gradient vectors contains a gradient direction of the pixel of interest;
      determine comparison results by comparing each of ratios of magnitudes of the two element gradient vectors with a predetermined threshold; and
      determine a gradient direction corresponding to a combination of the signs and the comparison results.

2. The gradient direction calculation device according to claim 1, wherein
   the processor determines the gradient direction by determining on of eight directions.

3. The gradient direction calculation device according to claim 1, wherein
   the processor calculates the two element gradient vectors by using a difference in pixel values of pixels in each of two diagonal directions in a set of four pixels including the pixel of interest.

4. The gradient direction calculation device according to claim 1, wherein
   the processor calculates one of the two element gradient vectors by using a difference in pixel values of two pixels adjacent to the pixel of interest in a vertical direction, and calculates the other of the two element gradient vectors by using a difference in pixel values of two pixels adjacent to the pixel of interest in a horizontal direction.

5. The gradient direction calculation device according to claim 1, wherein
   the processor determines the gradient direction by using a lookup table that takes as input a combination of the signs and the comparison results.

6. The gradient direction calculation device according to claim 1, wherein
   the processor determines the gradient direction by using a lookup table that takes as input a value obtained by respectively multiplying the signs and the comparison results by predetermined coefficients, and then summing the products.

7. The gradient direction calculation device according to claim 1, wherein
   the predetermined threshold is $\tan(22.5°)$ or an approximated value thereof.

8. The gradient direction calculation device according to claim 1, wherein
   the predetermined threshold is expressed as a fraction in which both a denominator and a numerator are expressed as an integer.

9. The gradient direction calculation device according to claim 8, wherein
   the processor sets whichever of the denominator and the numerator that requires a smaller number of bits to be expressed to a negative number, multiplies the denominator by a magnitude of one of the two element gradient vectors, multiplies the numerator by a magnitude of the other of the two element gradient vectors, and determines the comparison results according to the sign of a value obtained after summing the products.

10. A computer-implemented method for calculating a gradient direction of a pixel, the computer-implemented method comprising:
    calculating two element gradient vectors with respect to a pixel of interest by using a difference in pixel values in a vicinity of the pixel of interest, the two element gradient vectors being mutually perpendicular;
    determining, based on a combination of signs of the two element gradient vectors, which one of four quadrants defined by the two element gradient vectors contains a gradient direction of the pixel of interest;
    determining comparison results by comparing each of ratios of magnitudes of the two element gradient vectors with a predetermined threshold; and
    determining a gradient direction corresponding to a combination of the signs and the comparison results.

11. The computer-implemented method according to claim 10, further comprising:
    determining the gradient direction by determining one of eight directions.

12. The computer-implemented method according to claim 10, further comprising:
    calculating the two element gradient vectors by using a difference in pixel values of pixels in each of two diagonal directions in a set of four pixels including the pixel of interest.

13. The computer-implemented method according to claim 10, further comprising:
    calculating one of the two element gradient vectors by using a difference in pixel values of two pixels adjacent to the pixel of interest in a vertical direction; and
    calculating the other of the two element gradient vectors by using a difference in pixel values of two pixels adjacent to the pixel of interest in a horizontal direction.

14. The computer-implemented method according to claim 10, further comprising:

determining the gradient direction by using a lookup table that takes as input a combination of the signs and the comparison results.

15. The computer-implemented method according to claim 10, further comprising:

determining the gradient direction by using a lookup table that takes as input a value obtained by respectively multiplying the signs and the comparison results by predetermined coefficients, and then summing the products.

16. The computer-implemented method according to claim 10, wherein the predetermined threshold is tan(22.5°) or an approximated value thereof.

17. The computer-implemented method according to claim 10, wherein the predetermined threshold is expressed as a fraction in which both a denominator and a numerator are expressed as an integer.

18. The computer-implemented method according to claim 17, further comprising:

setting whichever of the denominator and the numerator that requires a smaller number of bits to be expressed to a negative number, multiply the denominator by a magnitude of one of the two element gradient vectors, multiply the numerator by a magnitude of the other of the two element gradient vectors, and determine the comparison results according to the sign of a value obtained after summing the products.

19. A non-transitory computer-readable storage medium having stored therein instructions executable by a processor to cause the processor to perform functions comprising:

calculating two element gradient vectors with respect to a pixel of interest by using a difference in pixel values in a vicinity of the pixel of interest, the two element gradient vectors being mutually perpendicular;

determining, based on a combination of signs of the two element gradient vectors, which one of four quadrants defined by the two element gradient vectors contains a gradient direction of the pixel of interest;

determining comparison results by comparing each of ratios of magnitudes of the two element gradient vectors with a predetermined threshold; and determining a gradient direction corresponding to a combination of the signs and the comparison results.

20. A gradient direction calculation device for calculating a gradient direction of a pixel, comprising:

a processing unit configured to:

calculate two element gradient vectors with respect to a pixel of interest by using a difference in pixel values in a vicinity of the pixel of interest, the two element gradient vectors being mutually perpendicular;

determine, based on a combination of signs of the two element gradient vectors, which one of four quadrants defined by the two element gradient vectors contains a gradient direction of the pixel of interest;

determine comparison results by comparing each of ratios of magnitudes of the two element gradient vectors with a predetermined threshold; and determine a gradient direction corresponding to a combination of the signs and the comparison results.

* * * * *